United States Patent
Itoo et al.

(10) Patent No.: US 8,911,312 B2
(45) Date of Patent: Dec. 16, 2014

(54) BELT TYPE CONTINUOUSLY VARIABLE TRANSMISSION

(75) Inventors: Seiji Itoo, Akashi (JP); Hideaki Kii, Kakogawa (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 427 days.

(21) Appl. No.: 13/267,721

(22) Filed: Oct. 6, 2011

(65) Prior Publication Data

US 2013/0090198 A1 Apr. 11, 2013

(51) Int. Cl.
*F16H 57/04* (2010.01)
*F16H 57/03* (2012.01)
*F16H 57/031* (2012.01)
*F16H 57/035* (2012.01)

(52) U.S. Cl.
CPC ............ *F16H 57/0416* (2013.01); *F16H 57/03* (2013.01); *F16H 57/031* (2013.01); *F16H 57/035* (2013.01); *F16H 57/0489* (2013.01)
USPC .......................................................... 474/93

(58) Field of Classification Search
USPC ............................................... 474/93; 62/151
See application file for complete search history.

(56) References Cited

U.S. PATENT DOCUMENTS

| | | | |
|---|---|---|---|
| 3,766,575 A | 10/1973 | Grengs | |
| 4,697,665 A | 10/1987 | Eastman et al. | |
| 6,338,688 B1 * | 1/2002 | Minami et al. | 474/144 |
| 6,510,912 B1 | 1/2003 | Atsuumi | |
| 6,820,708 B2 | 11/2004 | Nakamura | |
| 6,938,676 B2 | 9/2005 | Lan et al. | |
| 7,303,495 B2 * | 12/2007 | Schoenek et al. | 474/144 |
| 7,562,739 B2 | 7/2009 | Lan et al. | |
| 7,717,206 B2 | 5/2010 | Tanaka et al. | |
| 7,771,299 B2 | 8/2010 | Mochizuki et al. | |
| 7,882,911 B2 | 2/2011 | Nobuhira | |
| 7,967,100 B2 | 6/2011 | Cover et al. | |
| 8,002,061 B2 | 8/2011 | Yamamura et al. | |
| 8,091,670 B2 | 1/2012 | Suzuki et al. | |
| 8,256,563 B2 | 9/2012 | Suzuki et al. | |
| 2002/0134598 A1 | 9/2002 | Nakamura et al. | |

(Continued)

OTHER PUBLICATIONS

Itoo, Seiji et al., "Belt-Type Continuously Variable Transmission" U.S. Appl. No. 13/267,734, filed Oct. 6 2011, 29 pages.

(Continued)

*Primary Examiner* — William E Dondero
*Assistant Examiner* — Mark K Buse
(74) *Attorney, Agent, or Firm* — Alleman Hall McCoy Russell & Tuttle LLP

(57) ABSTRACT

A belt-type continuously variable transmission is provided. The belt-type continuously variable transmission includes a drive pulley assembly; a driven pulley assembly, a belt wrapped around these pulley assemblies, and a case assembly accommodating them. The case assembly includes a case body joined to a housing of a drive device such as an engine and a cover joined to the case body. Since an air-intake duct and an air discharge duct are attached to the case body, the cover can be configured to be thin, and thus the cover can be detached without providing a wide space in front of the cover in the direction in which the cover is detached. With this construction, the cover can be detached without detaching the air-intake duct and the air discharge duct, and thus maintenance can be performed easily.

7 Claims, 7 Drawing Sheets

(56) References Cited

U.S. PATENT DOCUMENTS

| | | |
|---|---|---|
| 2003/0066696 A1* | 4/2003 | Nakamura .................. 180/68.1 |
| 2004/0195018 A1 | 10/2004 | Inui et al. |
| 2006/0011401 A1 | 1/2006 | Nakamura et al. |
| 2006/0270503 A1 | 11/2006 | Suzuki et al. |
| 2009/0183937 A1 | 7/2009 | Yamamura et al. |
| 2010/0155170 A1 | 6/2010 | Melvin et al. |
| 2010/0167853 A1* | 7/2010 | Morita ............................ 474/13 |
| 2011/0048828 A1 | 3/2011 | Sunsdahl et al. |
| 2011/0220429 A1 | 9/2011 | Yamamura et al. |
| 2012/0247846 A1 | 10/2012 | Ichikawa |
| 2012/0289370 A1* | 11/2012 | Yamanishi et al. ............. 474/93 |

OTHER PUBLICATIONS

Itoo, Seiji et al., "Utility Vehicle" U.S. Appl. No. 13/269,341, filed Oct. 7, 2011, 23 pages.

Itoo, Seiji et al., "Utility Vehicle" U.S. Appl. No. 13/269,361, filed Oct. 7, 2011, 30 pages.

\* cited by examiner

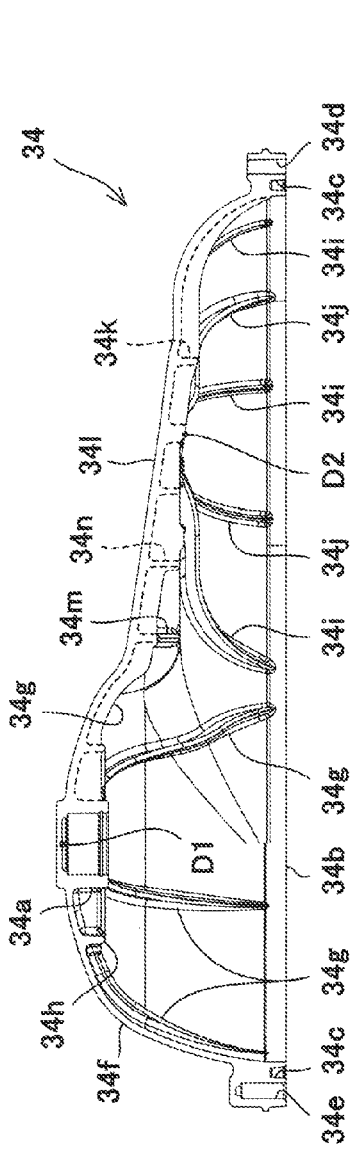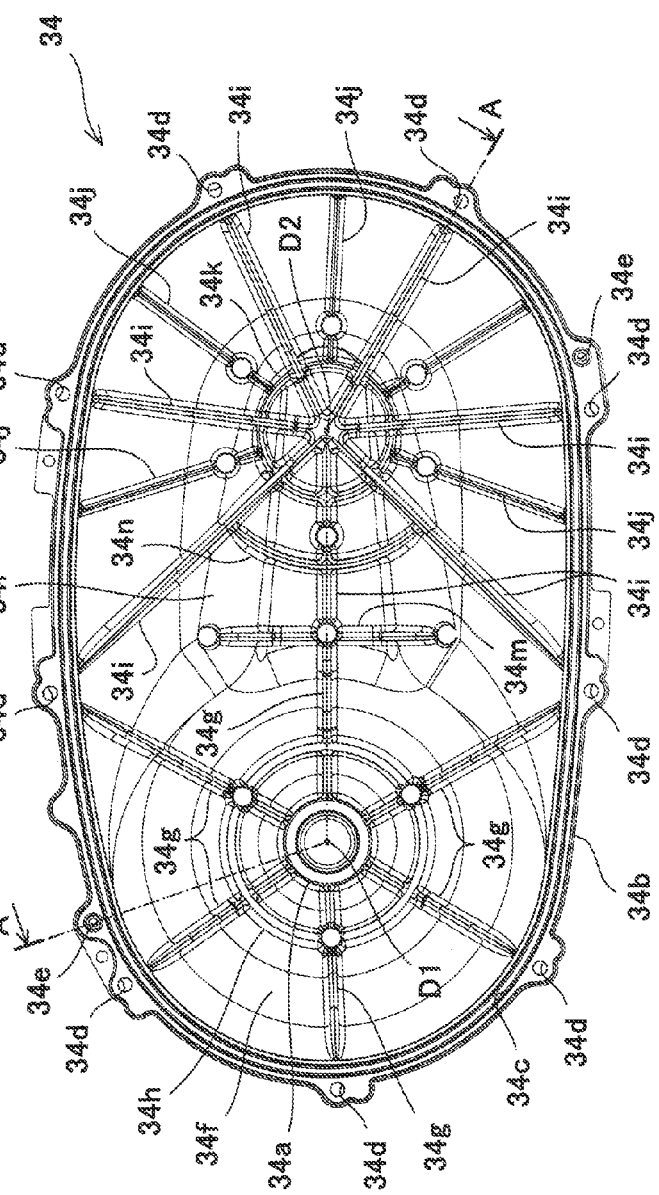

BELT TYPE CONTINUOUSLY VARIABLE TRANSMISSION

BACKGROUND OF THE INVENTION

1. Field of the Invention

The present invention relates to a belt-type continuously variable transmission incorporated into a vehicle. Particularly, the present invention relates to a structure of a case of the belt-type continuously variable transmission.

2. Description of the Related Art

U.S. Patent Application Publication No. 2010/0167853 discloses a conventional V-belt-type continuously variable transmission (CVT) built into a utility vehicle. In the continuously variable transmission disclosed in this literature, a fixed sheave of a drive pulley or a fixed sheave of a driven pulley is provided with fins which function as a centrifugal fan, and air introduced from outside into a case is caused to flow through the drive pulley and then the driven pulley, thereby cooling these pulleys and a V-belt.

The case of the continuously variable transmission includes a case body fastened to a crankcase of an engine and a cover joined to the case body. An air-intake duct is mounted to a peripheral wall of the case body in the vicinity of the drive pulley, while an air discharge duct is mounted to the cover of the transmission case in a vicinity of the driven pulley.

Since the air discharge duct is mounted to the cover of the transmission case in the conventional CVT as described above, the air discharge duct must first be detached and then the cover must be detached, when the case is opened for the purpose of maintenance. This is messy work. In addition, since the cover tends to have a substantial thickness, a relatively wide space is needed in front of the cover in a direction in which the cover is detached, when the cover is detached. This increases wasted space in the vehicle.

SUMMARY OF THE INVENTION

The present invention addresses the above described problem, and an object of the present invention is to provide a case assembly including a cover configured to have a small thickness to reduce wasted space in front of the cover in a direction in which the cover is detached, and to thereby achieve easier maintenance work in a belt-type continuously variable transmission incorporated into a vehicle.

A belt-type continuously variable transmission of the present invention comprises a drive pulley assembly mounted to a drive shaft; a driven pulley assembly mounted to a driven shaft; a belt wrapped around the drive pulley assembly and the driven pulley assembly; and a case assembly for accommodating the drive pulley assembly, the driven pulley assembly, and the belt; wherein the case assembly includes: a case body having a bottom wall portion joined to a housing of a drive device, and a peripheral wall portion surrounding the drive pulley assembly, the driven pulley assembly, and the belt; and a cover joined to the case body; and wherein an air-intake duct through which air from outside is taken into the case body and an air discharge duct through which the air is discharged are attached to the case body.

In the belt-type continuously variable transmission configured as described above, both the air-intake duct and the air discharge duct are attached to the case body, the case body and the cover constituting the case assembly. Therefore, the cover can be thinned as compared to a configuration in which one of the air-intake duct and the air discharge duct is attached to the cover. Because of this configuration, it is not necessary to provide a wide space to detach the cover in front of the cover in the direction in which the cover is detached, and wasted space in the vehicle can be reduced. In addition, the cover can be detached from the case body without detaching the air-intake duct and the air discharge duct. As a result, maintenance work can be performed easily.

The above and further objects, features and advantages of the invention will more fully be apparent from the following detailed description with reference to the accompanying drawings.

BRIEF DESCRIPTION OF THE DRAWINGS

FIG. 7A is a cross-sectional view showing a transmission cover taken along A-A of FIG. 7B.

FIG. 7B is a plan view showing the transmission cover when viewed from inside.

DETAILED DESCRIPTION OF THE PREFERRED EMBODIMENTS

Figure 1:
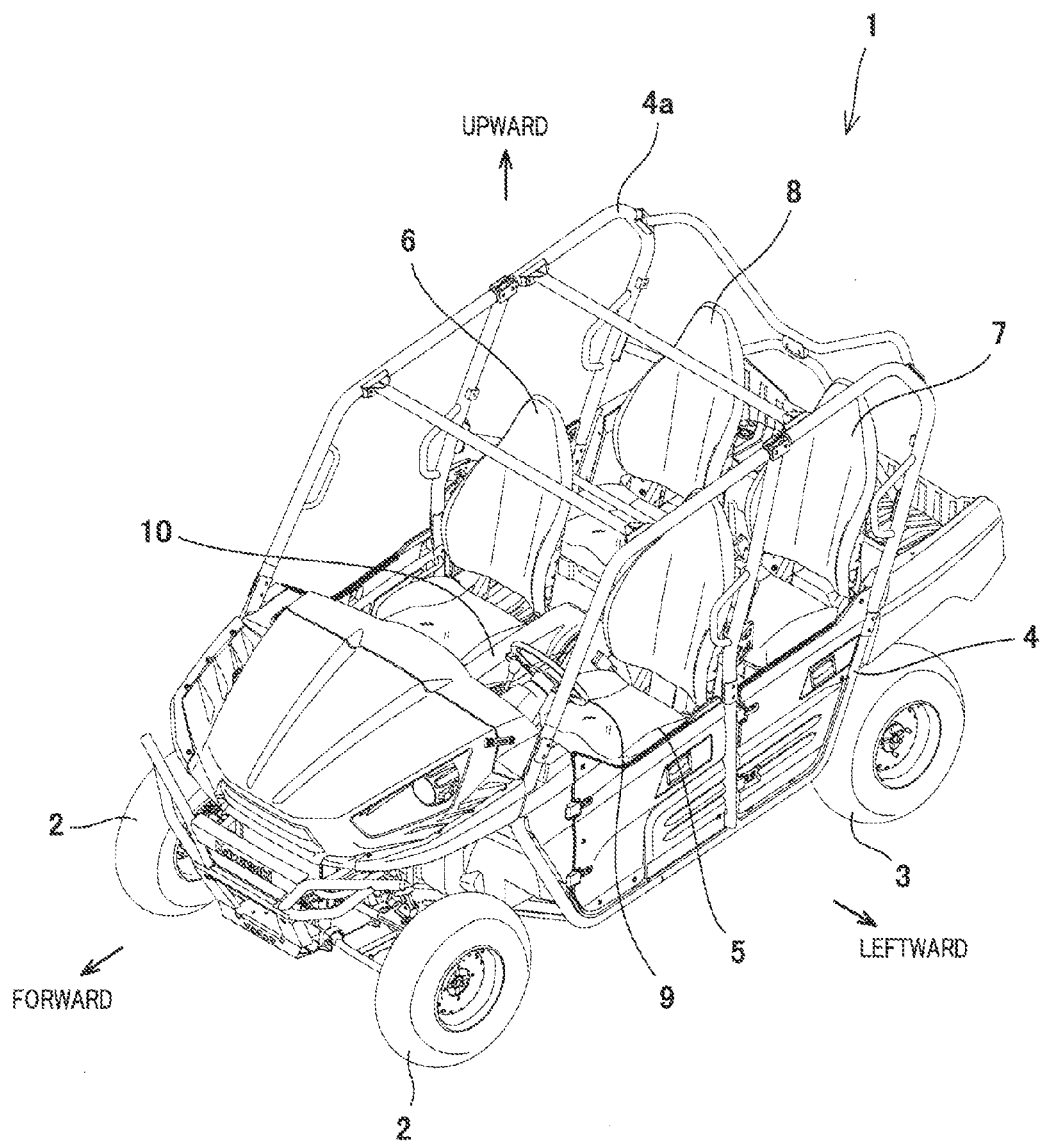
FIG. 1 is a perspective view showing an external appearance of a utility vehicle according to an embodiment of the present invention.

Hereinafter, an embodiment of the present invention will be described with reference to the drawings. Throughout the drawings, the same or corresponding components are identified by the same reference numerals and will not be described in repetition. The stated directions are referenced from the perspective of a driver riding in a utility vehicle.

FIG. 1 is a perspective view showing an external appearance of the utility vehicle 1 (vehicle) according to an embodiment of the present invention. For example, the utility vehicle 1 is intended for four persons and has four wheels. The utility vehicle 1 includes a pair of right and left front wheels 2, a pair of right and left rear wheels 3, a vehicle body frame 4, a driver seat 5, a passenger seat 6, a left rear seat 7, and a right rear seat 8. The front wheels 2 are suspended from the front portion of the vehicle body frame 4, while the rear wheels 3 are suspended from the rear portion of the vehicle body frame 4. The four seats 5~8 are mounted on the vehicle body frame 4, and are arranged between the front wheels 2 and the rear wheels 3 in a forward and rearward direction.

The vehicle body frame 4 has a cabin frame (ROPS) 4a surrounding a cabin for passengers. The driver seat 5 and the passenger seat 6 are arranged side by side in a rightward and leftward direction in a front-half portion inside the cabin which is defined by the cabin frame 4a. Although the driver seat 5 is located at the left and a steering wheel 9 steered by the driver is disposed in front of the driver seat 5 in the present embodiment, they may be located at the right. The left rear seat 7 and the right rear seat 8 are arranged side by side in a rear-half portion inside the cabin. A console box 10 is provided between the driver seat 5 and the passenger seat 6, and positioned at a substantially center region inside the cabin.

Figure 2:
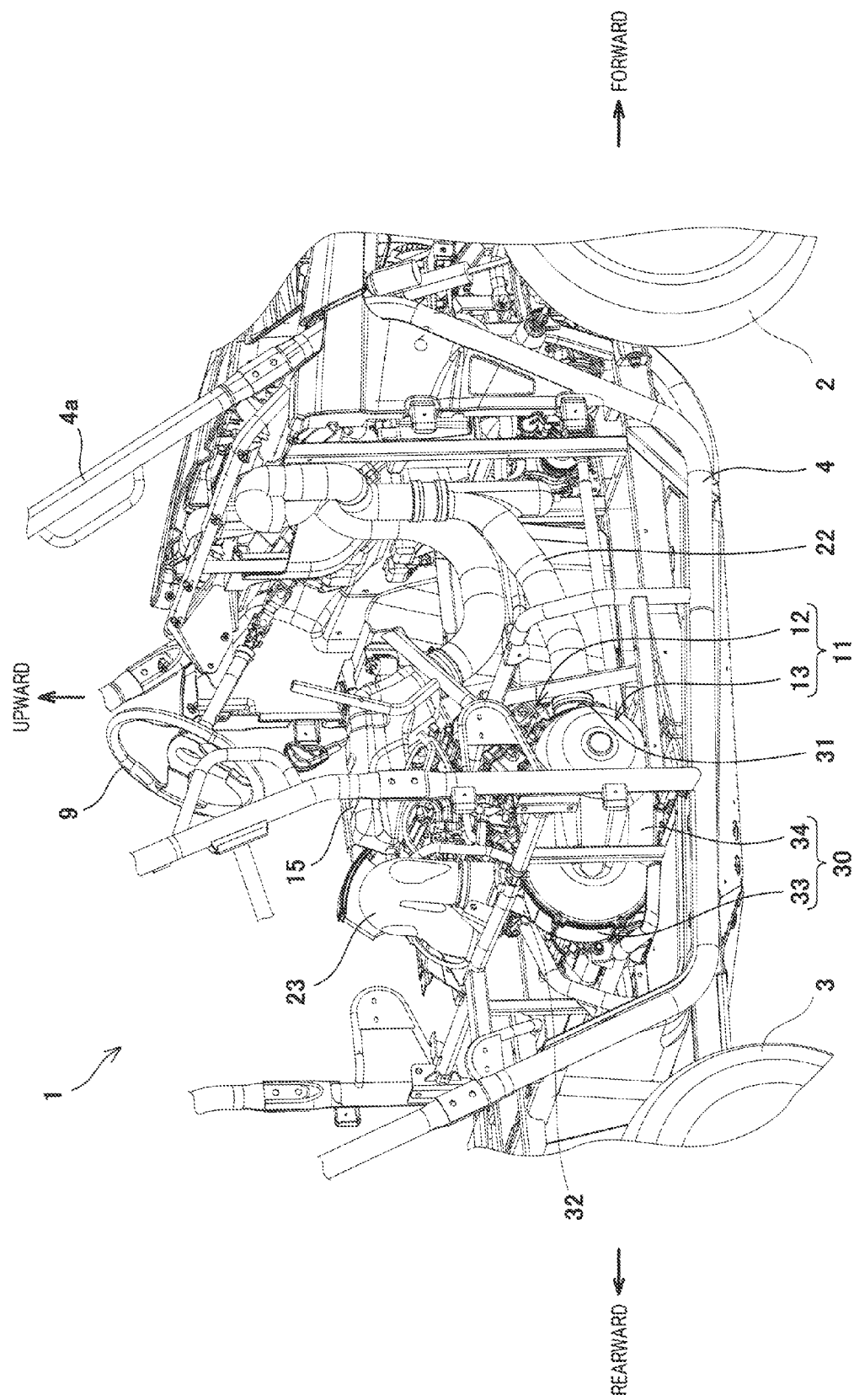
FIG. 2 is a perspective view of the utility vehicle, showing an engine unit when viewed from rightward and slightly obliquely rearward, in a state where a part of components are omitted from the utility vehicle.

FIG. 2 shows an engine unit 11 of the utility vehicle 1 when viewed from rightward and slightly obliquely rearward, in a state where a part of the components such as the driver seat 5, the passenger seat 6, the console box 10, etc., are omitted from the utility vehicle 1. In the utility vehicle 1 of the present embodiment, the engine unit 11 is accommodated into the console box 10. As shown in FIG. 2, the engine unit 11 is positioned at a substantially center region inside the cabin. The engine unit 11 is an assembly including an engine 12 and a transmission 13 which are unitarily coupled together. Although not shown, the transmission 13 is coupled with propeller shafts, differentials, etc., to allow a driving power of the engine 12 to be transmitted to the front wheels 2 and to the rear wheels 3.

Figure 3:
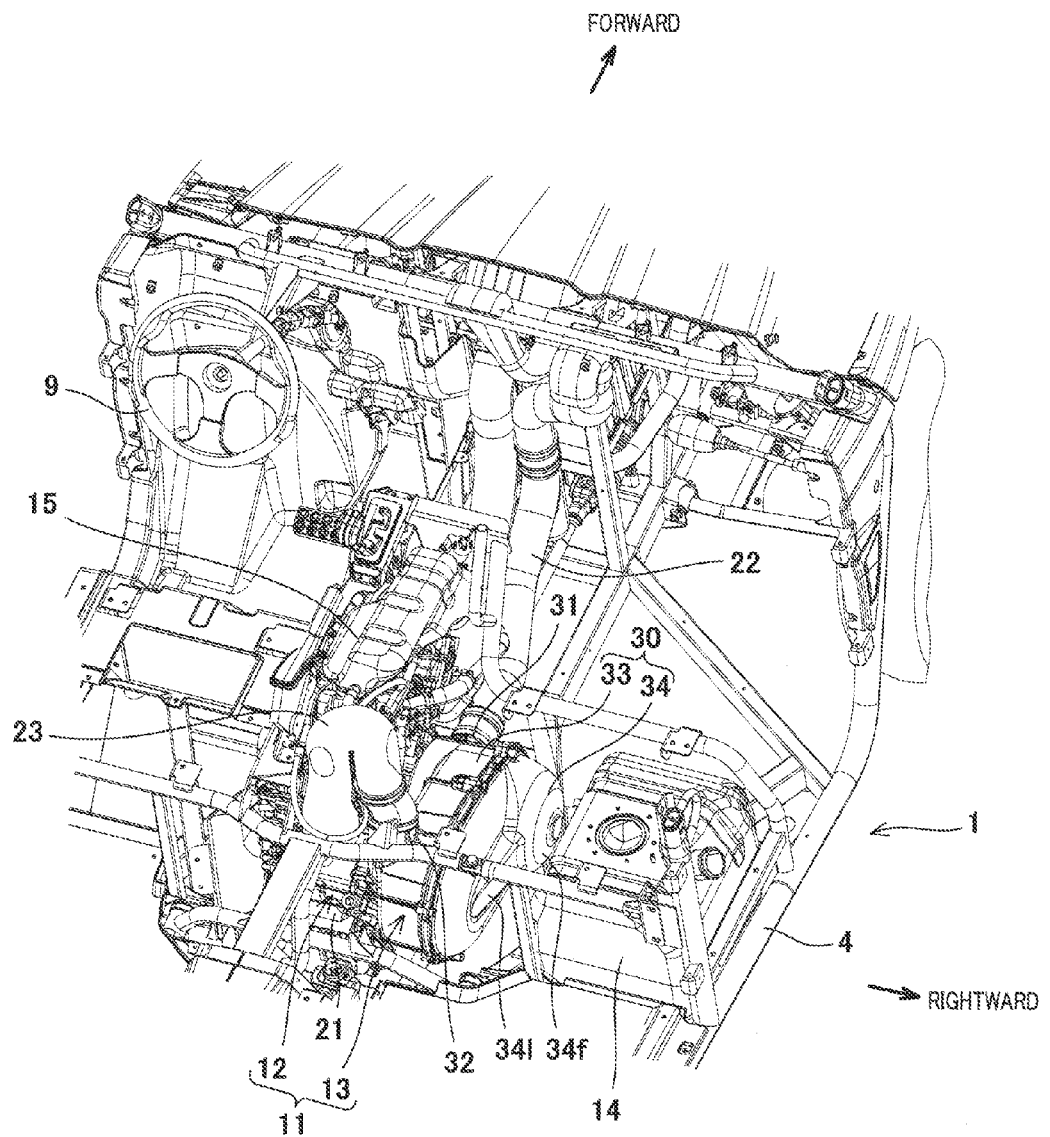
FIG. 3 is a perspective view showing the engine unit when viewed from above, rightward and obliquely rearward.

When viewed from above, slightly rightward and obliquely rearward in FIG. 3, in the engine unit 11, the transmission 13 is positioned at a right side of a crankcase 21 of the engine 12. As described later with reference to FIG. 5, and others, a drive shaft 41 which is an input shaft of the transmission 13 is coupled to a crankshaft 20 via a centrifugal clutch 26. At the right side of the transmission 13, a fuel tank 14 (not shown in FIG. 2) is positioned such that the fuel tank 14 is spaced apart from the transmission 13 to allow a transmission cover 34 to be detached for the purpose of maintenance. In FIGS. 2 and 3, reference symbol 15 designates an air-intake chamber disposed above the engine 12.

As shown in FIGS. 2 and 3, a case 30 (case assembly: hereinafter referred to as a transmission case 30) of the transmission 13 has a substantially elongated-circle shape when viewed from the side. An air-inlet 31 of a substantially cylindrical shape protrudes from a front portion of a peripheral wall extending in a forward and rearward direction and in an upward and downward direction, and a rear end portion of an air-intake duct 22 is coupled to the air-inlet 31. The air-intake duct 22 extends forward inside the console box 10 (see FIG. 1) and then is bent in front of a dash panel (not shown). The air-intake duct 22 extends upward, and then its upper end portion is curved rearward. After that, the air-intake duct 22 opens downward. Since the air-intake duct 22 opens at a relatively high position in this way, it is possible to sufficiently suppress rain water or muddy water from flowing into the air-intake duct 22.

An air outlet 32 protrudes from the rear end portion of the upper portion of the peripheral wall of the transmission case 30, and a lower end portion of an air discharge duct 23 is coupled to the air outlet 32. The air discharge duct 23 extends upward, and then is bent back in a vicinity of an upper wall of the console box 10 (see FIG. 1) inside thereof. Then, the air discharge duct 23 extends downward, and its lower end portion opens downward and slightly obliquely rearward. In this way, since the uppermost portion of the air discharge duct 23 is positioned substantially as high as the console box 10, rain water or muddy water is less likely to enter the transmission case 30, after it has flowed into the air discharge duct 23.

—Overall Configuration of Transmission—

Figure 4:
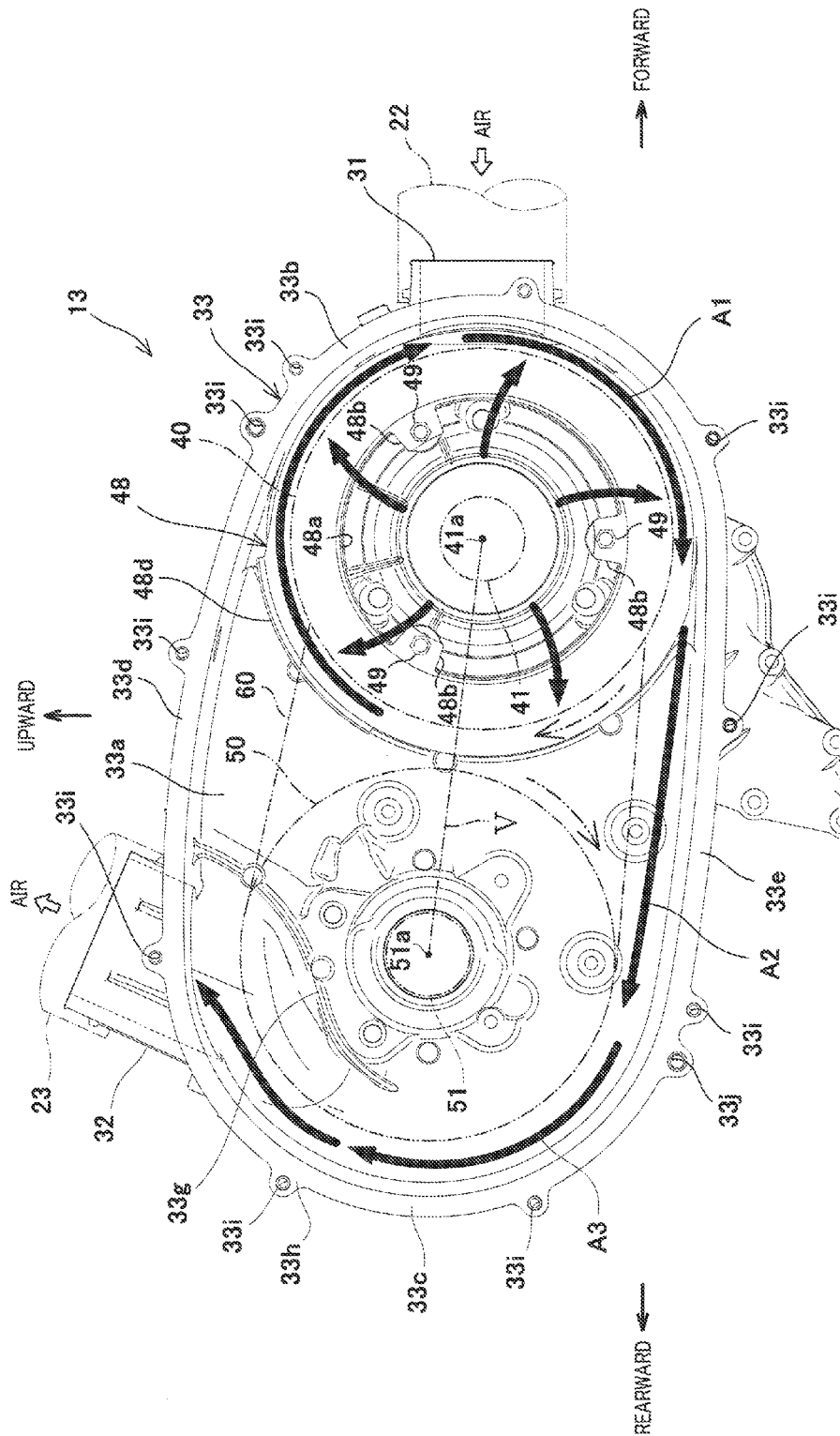
FIG. 4 is a view showing a flow of cooling air in an interior of a case of a transmission.
Figure 5:
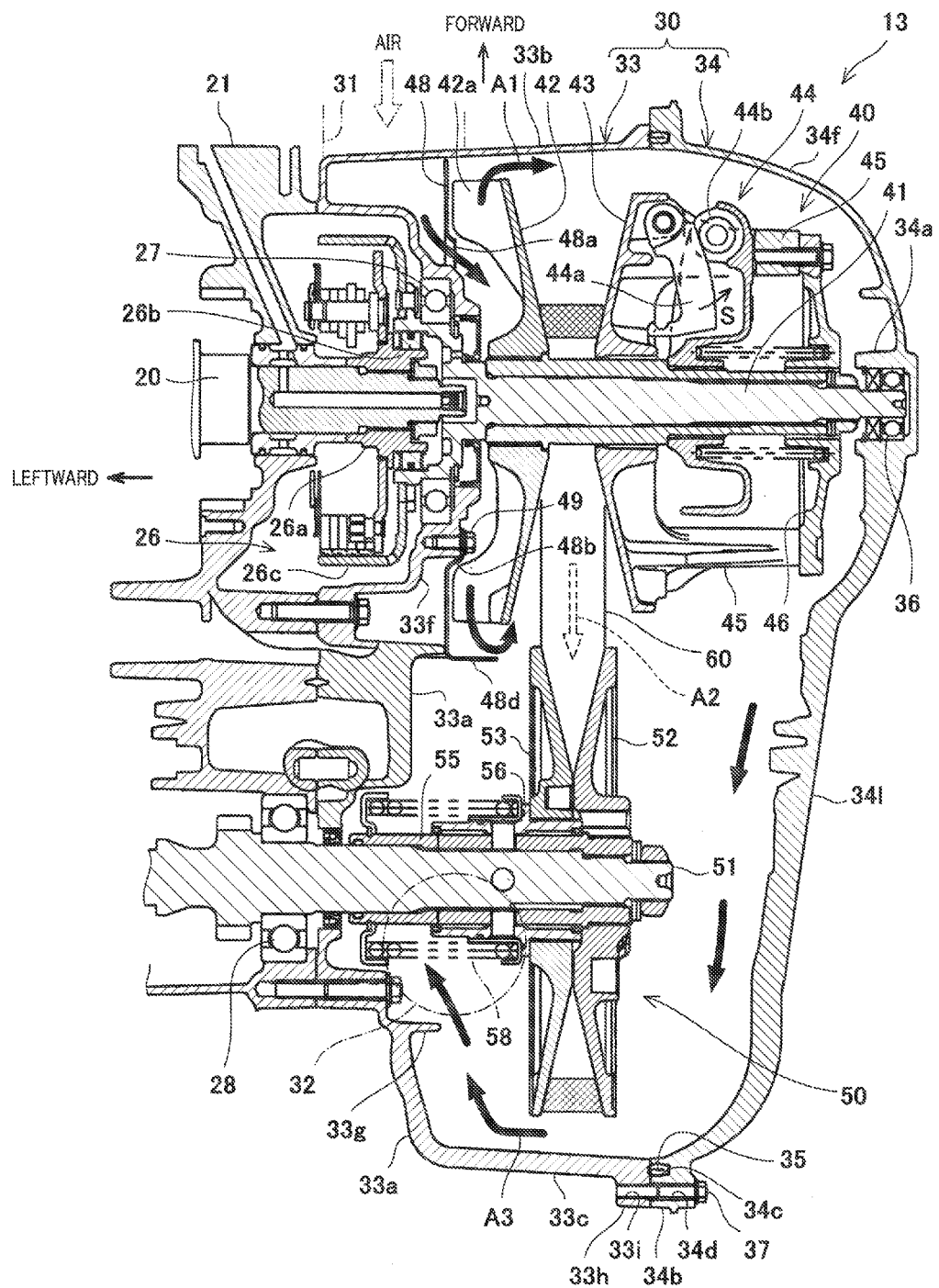
FIG. 5 is a cross-sectional view showing a structure of the transmission.

Next, the structure of the transmission 13 will be described in detail with reference to FIGS. 4 and 5. FIG. 4 is a view showing a flow of cooling air in the interior of the transmission case 30. FIG. 5 is a cross-sectional view showing the internal structure of the transmission 13. Hereinafter, the forward and rearward direction, and the rightward and leftward direction are referenced in the state where the transmission 13 is incorporated into the utility vehicle 1.

As shown in FIGS. 4 and 5, in the present embodiment, the transmission 13 is a V-belt-type continuously variable transmission, and accommodates a drive pulley 40 (drive pulley assembly) and a driven pulley 50 (driven pulley assembly) which are arranged at the front and at the rear, respectively, inside the transmission case 30 which is elongated in a forward and rearward direction. As shown in FIG. 5, the drive pulley 40 is mounted to a drive shaft 41 which is an input shaft, while the driven pulley 50 is mounted on a driven shaft 51 which is an output shaft. A V-belt 60 is wrapped around the pulleys 40 and 50. As described later, a radius (effective diameter) of each of the pulleys 40 and 50 around which the V-belt 60 is wrapped is changed, thereby changing a transmission ratio continuously.

As shown in FIG. 3 in addition to FIG. 5, the transmission case 30 includes a body member 33 (hereinafter referred to as a transmission case body 33) fastened to the crankcase 21 (reference symbol 21 appears only in FIGS. 3 and 5) of the engine 12 such that a bottom wall portion 33a faces to the left, and a cover 34 (hereinafter referred to as a transmission cover 34) joined to a right opening of the transmission case body 33. The transmission case body 33 has peripheral wall portions 33b~33e (see FIG. 4) extending vertically upward at the right from the outer peripheral edge of the bottom wall portion 33a, over the entire periphery.

When viewed from the right side, as shown in FIG. 4, the peripheral wall portions 33b~33e have an elongated-circle shape surrounding an elongated-circle defined by the drive pulley 40, the driven pulley 50 and the V-belt 60 with a predetermined gap between them. To be specific, the peripheral wall portions include the front wall portion 33b having a substantially semi-circular shape and surrounding from forward, a portion of the drive pulley 40 corresponding to about a half of its periphery, along its outer periphery, the rear wall portion 33c having a substantially semi-circular shape and surrounding from rearward, a portion of the driven pulley 50 corresponding to about a half of its periphery, along its outer periphery, the upper wall portion 33d connecting the front wall portion 33b to the rear wall portion 33c, and the lower wall portion 33e connecting the front wall portion 33b to the rear wall portion 33c.

Turning back to FIG. 5, the bottom wall portion 33a of the transmission case body 33 has a portion swelling inward (rightward), in a front portion thereof corresponding to the drive pulley 40, and a clutch cover member 33f is provided within a dented portion formed at a back side (left side) of the swelling portion to accommodate a centrifugal clutch 26 therein. The tip end portion (right end portion) of the crankshaft 20 of the engine 12 penetrates the right side wall of the crankcase 21, protrudes into the clutch cover member 33f and is joined to an inner member 26a of the centrifugal clutch 26 such that the crankshaft 20 is rotatable integrally with the centrifugal clutch 26.

The inner member 26a of the centrifugal clutch 26 is coupled to a clutch housing 26c via a one-way clutch 26b. The clutch housing 26c is rotatable integrally with the drive shaft 41 of the transmission 13, and is rotatably supported on the inner peripheral side of the clutch cover member 33f via a ball bearing 27. Therefore, in a state where the centrifugal clutch 26 can transmit a driving power, the rotation of the crankshaft 20 of the engine 12 (not shown in FIG. 5) is inputted to the drive shaft 41 via the centrifugal clutch 26.

The rear portion of the bottom wall portion 33a of the transmission case body 33, corresponding to the driven pulley 50, is fastened to the rear portion of the right side wall of the crankcase 21 of the engine 12 (not shown in FIG. 5). The driven shaft 51 is rotatably supported on the right side wall of the crankcase 21 via a ball bearing 28 in a state where the driven shaft 51 penetrates the bottom wall portion 33a of the transmission case body 33 and the right side wall of the rear portion of the crankcase 21. Although not shown in the drawings, the left-half portion of the driven shaft 51 protruding into the crankcase 21 is the input shaft of a gear transmission mechanism, and the output shaft of the gear transmission mechanism is coupled to propeller shafts, differentials, etc., to transmit driving power to the front wheels 2 and to the rear wheels 3.

—Drive Pulley—

The drive pulley 40 includes a fixed sheave 42 fixed to the drive shaft 41, a movable sheave 43 fitted to the drive shaft 41 such that the movable sheave 43 is movable in an axial direction of the drive shaft 41, and a sheave thrust generating mechanism 44 of, for example, a flyweight type. As described above, one end portion (left end portion) of the drive shaft 41 is mounted on the clutch cover member 33f unitarily with the housing 26c of the centrifugal clutch 26 via the ball bearing 27. The opposite end portion (right end portion) of the drive shaft 41 is mounted to a boss portion 34a formed on the transmission case cover 34 via a ball bearing 36. That is, the drive shaft 41 is supported by the clutch cover member 33f of the transmission case body 33 and the transmission cover 34 such that its both ends are mounted to the clutch cover member 33f and the transmission cover 34, respectively.

The fixed sheave 42 is fixed to the left end portion of the drive shaft 41, while the movable sheave 43 is fitted to the drive shaft 41 and positioned at the right side of the fixed sheave 42 to face the fixed sheave 42 such that the movable sheave 43 is movable in an axial direction of the drive shaft 41. The V-belt 60 is retained on conical retaining surfaces of the sheaves 42 and 43. When the movable sheave 43 moves on the drive shaft 41 and thereby a distance between the movable sheave 43 and the fixed sheave 42 changes, the position at which the V-belt 60 is retained changes, i.e., the effective diameter of the drive pulley 40 changes. As the distance between the fixed sheave 42 and the movable sheave 43 decreases, the effective diameter increases, while as the distance between the fixed sheave 42 and the movable sheave 43 increases, the effective diameter decreases.

A receiver plate 46 of a rectangular frame shape is joined to the back surface of the movable sheave 43 via a plurality of coupling arms 45 extending to the right. The receiver plate 46 is movable integrally with the movable sheave 43 in the axial direction of the drive shaft 41. A sheave thrust generating mechanism 44 is provided between the movable sheave 43 and the receiver plate 46. Although the internal construction of the sheave thrust generating mechanism is not explained herein in detail, the operational principles of this mechanism may, for example, be as follows. The sheave thrust generating mechanism 44 is configured in such a manner that a plurality of flyweights 44a rotate by a centrifugal force in a direction indicated by an arrow S in FIG. 5, to press a pressure-receiving roller 44b, and the resulting reactive force causes the movable sheave 43 and receiver plate 46 to move to the left (toward the fixed sheave 42). In brief, the sheave thrust generating mechanism 44 generates a thrust to reduce the distance between the fixed sheave 42 and the movable sheave 43 by using the centrifugal force generated by the rotation of the drive pulley 40.

—Driven Pulley—

In the driven pulley 50, the fixed sheave 52 is fixed to the right end portion of the driven shaft 51, while the movable sheave 53 is fitted to the driven shaft 51 and positioned at the left side of the fixed sheave 52 to face the fixed sheave 52 such that the movable sheave 53 is movable in the axial direction of the driven shaft 51. For example, a cam tube 55 having a plurality of spiral cam channels is attached to the outer peripheral surface of the driven shaft 51, and the cam tube 55 and the fixed sheave 52 are rotatable integrally with the driven shaft 51. A sleeve 56 is unitarily coupled to the inner peripheral end portion of the movable sheave 53. The sleeve 56 is fitted to the outer peripheral surface of the cam tube 55 such that the sleeve 56 is movable in an axial direction and supports a roller (not shown) movable along the cam channels of the cam tube 55.

The cam channels of the cam tube 55 have a spiral shape extending to the right of the axial direction of the driven shaft 51 as it is closer to a forward side in a rotational direction of the driven shaft 51. Because of this, when the movable sheave 53 receives a rotational force in the forward direction of the rotational direction by a tension of the V-belt 60, a thrust acting in the rightward direction of the axial direction is generated by a cam action performed by the cam channels of the cam tube 55 and the roller. The sleeve 56 is biased to the right (toward the fixed sheave 52) in the driven shaft 51 by a pressure-adjusting spring 58. A pressing force is applied by the sleeve 56 to press the movable sheave 53 against the fixed sheave 52, in addition to the above thrust, thereby keeping a state where the effective diameter of the driven pulley 50 is a maximum diameter as shown in FIG. 5.

In such a configuration, in the transmission 13, in a state where the centrifugal clutch 26 is disengaged and the drive shaft 41 is not rotating, for example, during a stopped state or idling state of the engine 12, the movable sheave 43 of the drive pulley 40 and the receiver plate 46 are together in a right end position of the drive shaft 41, and the movable sheave 53 of the driven pulley 50 is in a right end position of the driven shaft 51. Because of this, when the centrifugal clutch 26 is engaged and the drive shaft 41 starts rotating, the transmission 13 is in a state where the effective diameter of the drive pulley 40 is small and the effective diameter of the driven pulley 50 is great, i.e., in a state of a low speed-reduction ratio.

With an increase in engine speed, the centrifugal force increases, thereby causing the sheave thrust generating mechanism 44 to generate thrust, in the drive pulley 40. Since the movable sheave 43 moves to the left in the axial direction of the drive shaft 41, the distance between the movable sheave 43 and the fixed sheave 42 decreases, and as a result, the effective diameter of the drive pulley 40 increases. In addition, the tension of the V-belt 60 increases. As a result, due to an increase in a wedge force of the V-belt 60, in the driven pulley 50, the movable sheave 53 of the driven pulley 50 moves to the left in a spiral shape away from the fixed sheave 52, against the spring force applied by the pressure-adjusting spring 58 and the cam thrust generated by the cam tube 55. In this way, the distance between the movable sheave 53 and the fixed sheave 52 increases, and the radius of the portion of the V-belt 60 which is wrapped around the driven pulley 50, i.e., the effective diameter of the driven pulley 50 decreases.

As described above, in the transmission 13, the effective diameter of the drive pulley 40 increases gradually and the effective diameter of the driven pulley 50 decreases gradually, with an increase in the engine speed rotation input to the transmission 13. In other words, the speed reduction ratio of an output shaft rotational speed with respect to an input shaft rotational speed of the transmission 13 decreases. Therefore, vehicle speed changes continuously from a low-speed to a high-speed.

—Cooling Structure of Transmission—

As shown in FIG. 5, a plurality of fins 42a are radially provided on the back surface (left surface) of the fixed sheave 42 of the drive pulley 40 and function as a centrifugal fan. These fins 42a generate an air flow (indicated by an arrow in FIG. 4) in a direction from the inner periphery toward the outer periphery according to the rotation of the fixed sheave 42. A circularly annular shaped air guide plate 48 having a greater outer diameter than the fixed sheave 42 is provided to face the back surface of the fixed sheave 42 in close proximity to the fins 42a. The air guide plate 48 has a substantially ring-shape formed by, for example, pressing a steel plate by press forming. The air guide plate 48 has a substantially circular opening 48a in a center region thereof. Three projections 48b are provided at the inner peripheral edge of the opening 48a at substantially equal intervals along its periphery. The projections 48b are fastened to the clutch cover member 33f of the transmission case body 33 by bolts 49, respectively.

At the left side of the air guide plate 48 mounted to the clutch cover member 33f, an annular space is formed so as to surround the clutch cover member 33f. An air inlet 31 opens to face the space. The opening 48a in the center region of the air guide plate 48 surrounds the clutch cover member 33f with a gap between them, thereby forming an air inlet of a substantially circularly annular shape. When the fixed sheave 42 rotates, the air taken into the space through the air inlet 31 flows to a region closer to a center of the fixed sheave 42 through the air inlet 31 and then flows radially toward the outer periphery of the fixed sheave 42, as indicated by an arrow shown in FIG. 5 (see FIG. 4).

The air (hereinafter referred to as cooling air) blowing beyond the outer periphery of the fixed sheave 42, i.e., the outer periphery of the drive pulley 40, is directed to flow in the forward direction of the rotational direction of the drive pulley 40 by the front wall portion 33b of the transmission case body 33, facing the front side of the drive pulley 40, and then flows downward along the front wall portion 33b. A part of the flow of the cooling air blowing rearward relative to the drive pulley 40 is blocked by an air blocking plate 48d and is directed to flow in the forward direction of the rotational direction around the drive pulley 40.

In the present embodiment, as shown in FIG. 4, in a region between the drive pulley 40 and the driven pulley 50, where the air flow in the vicinity of the drive pulley 40 and the air flow in the vicinity of the driven pulley 50 collide against each other, the air blocking plate 48d is provided within a predetermined range so as to surround the outer periphery of the drive pulley 40. Although the air blocking plate 48d is formed by, for example, bending the outer periphery of the air guide plate 48 such that the air blocking plate 48d and the air guide plate 48 constitute a unitary component, an air blocking plate may alternatively be mounted to the transmission case body 33 independently of the air guide plate 48, or otherwise, an air blocking plate may be formed unitarily with the transmission case body 33.

As shown in FIG. 4, when the transmission case body 33 is viewed from the right side in a state where the transmission cover 34 is detached (i.e., when the transmission case body 33 is viewed in the axial direction of the drive shaft 41), an upward air flow of the cooling air blowing toward the outer periphery of the drive pulley 40, is blocked by the air blocking plate 48d. As indicated by an arrow A1 in FIG. 4, there is formed a flow of the cooling air moving clockwise in FIG. 4, around the drive pulley 40, and along the front wall portion 33b of the transmission case body 33 from the air blocking plate 48d.

The flow A1 of the cooling air moves along the lower wall portion 33e of the transmission case body 33 and joins the flow of the air moving in the vicinity of a region below the driven pulley 50 and behind the drive pulley 40, as indicated by an arrow A2 in FIG. 4. Since the driven pulley 50 has no fins, a relatively weak flow of air moving in the forward direction of the rotational direction is generated in the vicinity of the driven pulley 50, but a strong flow of air moving to the outer periphery is not generated. Because of this, the flow A2 of the cooling air from the drive pulley 40 is not significantly disturbed.

After the cooling air has joined the flow of the air in the vicinity of the region below the driven pulley 50, it moves so as to draw a curve, along the rear wall portion 33c from the lower wall portion 33e of the transmission case body 33, in the forward direction of the rotational direction of the driven pulley 50 (indicated by an arrow A3). After that, the air is discharged into the air outlet 32 provided in a range from the upper end of the rear wall portion 33c to the upper wall portion 33d continuous with the rear wall portion 33c in the transmission case body 33. That is, the flow A3 of the cooling air moves around substantially half of the driven pulley 50, and the cooling air is thereafter discharged.

Since the air outlet 32 is tilted upward and obliquely forward, the flow A3 of the cooling air moving in the forward direction of the rotational direction, in the vicinity of the driven pulley 50, is discharged into the air outlet 32 smoothly. To guide the flow A3 of the cooling air toward the air outlet 32, a guide rib 33g is provided on the bottom wall portion 33a of the transmission case body 33.

—Structure of the Transmission Case—

Figure 6A:
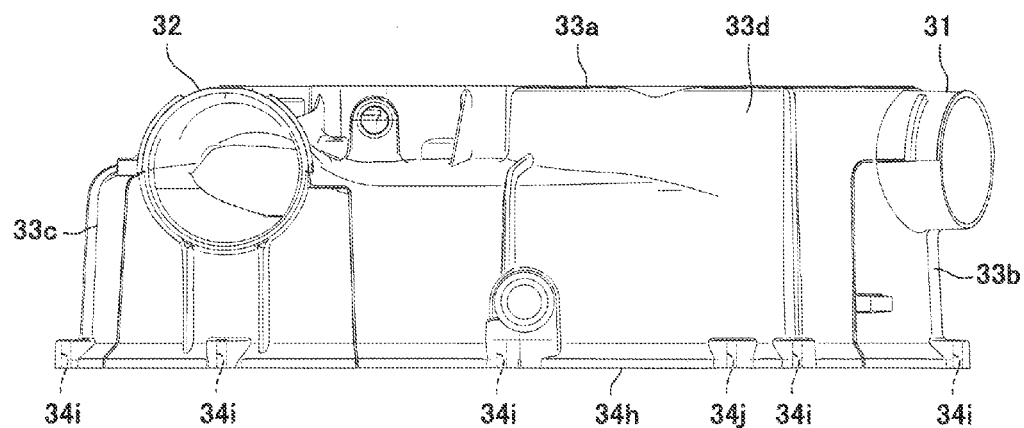
FIG. 6A is a plan view showing a case body when viewed from above.
Figure 6B:
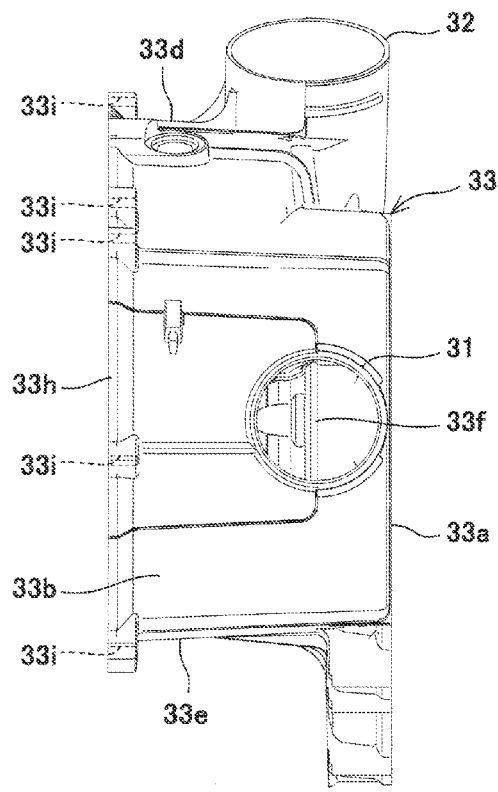
FIG. 6B is a front view showing the case body when viewed from forward.

Next, the structure of the transmission case 30 will be described with reference to FIGS. 6 and 7. FIG. 6A is a plan view showing the transmission case body 33 when viewed from above. FIG. 6B is a front view showing the transmission case body 33 when viewed from the front. FIG. 7A is a cross-sectional view showing the transmission cover 34 taken along A-A of FIG. 7B. FIG. 7B is a plan view showing the transmission cover 34 when viewed from inside. In the present embodiment, the transmission case body 33 and the transmission cover 34 are made of, for example, aluminum alloy, and are manufactured by low-pressure casting or gravity casting.

As shown in FIG. 4, in addition to FIGS. 6A and 6B, the cylindrical air inlet 31 is provided on the front wall portion 33b of the transmission case body 33, and the air-intake duct 22 (see FIG. 2) is coupled to the air inlet 31. The cylindrical air outlet 32 is provided in a range from the upper end of the rear wall portion 33c to the upper wall portion 33d continuous with the rear wall portion 33c in the transmission case body 33, and the air discharge duct 23 (see FIG. 2) is coupled to the air outlet 32. As shown in FIG. 5, a flange 33h is provided at the tip ends (right ends) of the peripheral wall portions 33b~33e such that the flange 33h is greater in width than the peripheral wall portions 33b~33e, and a flange 34b provided at the outer periphery of the transmission cover 34 is joined to the flange 33h.

As shown in FIGS. 7A and 7B, the flange 34b extends over the entire outer periphery of the transmission cover 34, and a peripheral groove 34c of a substantially elongated-circle shape opens in the flange 34b. A trim seal 35 (see FIG. 5) made of an elastic material which is internally fitted to the peripheral groove 34c serves to tightly seal the flange 33h of the transmission case body 33 and the flange 34b of the transmission cover 34.

As shown in FIG. 7B and FIG. 4, bolt holes 33i are formed on the flange 33h of the transmission case body 33 such that they are arranged at substantially equal intervals along the periphery of the transmission case body 33, while bolt holes 34d are formed on the flange 34b of the transmission cover 34 such that they are arranged at substantially equal intervals along the periphery of the transmission cover 34. For example, nine bolt holes 33i and nine bolt holes 34d are formed. The flange 33h and the flange 34b are fastened together by bolts 37 (see FIG. 5) inserted into the bolt holes 33i and the bolt holes 34d. A pin hole 33j into which a positioning pin (not shown) is inserted is provided near each of the bolt holes 33i in a relatively forward position at the upper side in the flange 33h of the transmission case body 33 and the bolt holes 33i in a relatively rearward position at the lower side in the flange 33h of the transmission case body 33. Likewise, pin holes 34e are formed on the flange 34b of the transmission cover.

In the present embodiment, as described above, the air inlet 31 and the air outlet 32 are provided on the peripheral wall portions 33b~33e of the transmission case body 33, and the air-intake duct 22 and the air discharge duct 23 are attached to the air inlet 31 and the air outlet 32, respectively. Therefore, the peripheral wall portion of the transmission case 30 is substantially constituted by the peripheral wall portions 33b~33e of the transmission case body 33, and the transmission cover 34 joined to the transmission case body 33 entirely has a dish (plate) shape of an elongated-circle with a shallow depth.

A dome-shaped portion 34f swells and protrudes outward in the front-half portion of the transmission cover 34, corresponding to the drive pulley 40. At a substantially center portion of the inner surface of the dome-shaped portion 34f, i.e., a drive-side center portion D1 of the transmission cover 34, corresponding to a center axis 41a of the drive shaft 41, the boss portion 34a is provided, and the ball bearing 36 for supporting the right end portion of the drive shaft 41 is fitted into the boss portion 34a. The provision of the dome-shaped portion 34f can advantageously improve the stiffness of the overall transmission cover 34 of the dish shape of a shallow depth. The dome-shaped portion 34f allows the drive shaft 41 to be supported with an improved stiffness.

As shown in FIG. 7B, six ribs 34g (drive-side ribs) are provided on the inner surface of the dome-shaped portion 34f to extend radially toward the outer periphery from the protruding boss portion 34a. Among the six ribs 34g, the inner ends of five ribs 34g are connected to the boss portion 34a, while the outer ends thereof are connected to the flange 34b in the vicinity of the bolt holes 34d. Since the regions near the bolt holes 34d are connected to the boss portion 34a by the ribs 34g in this way, the stiffness of the dome-shaped portion 34f can be improved effectively.

In addition, in the present embodiment, a circumferential rib 34h is provided to surround the outer periphery of the boss portion 34a with a predetermined distance between them and connects the six ribs 34g together in the circumferential direction. This makes it possible to improve stiffness of the dome-shaped portion 34f effectively. As shown in FIG. 7A, the height of the circumferential rib 34h is substantially equal to that of the boss portion 34a. The boss portion 34a is connected to the circumferential rib 34h concentric with the boss portion 34a by the six ribs 34g, thereby allowing the drive shaft 41 to be supported with improved stiffness.

Among the six ribs 34g, one rib 34g which is not connected to the flange 34b, extends in the lengthwise direction of the transmission cover 34 and is connected linearly to a driven-side rib 34i as described below. To be specific, in the present embodiment, the transmission cover 34 is provided on the inner surface thereof, with a plurality of ribs 34i extending radially toward the outer periphery from a driven-side center portion D2 corresponding to a center axis 51a of the driven shaft 51. The ribs 34i are intended to effectively improve stiffness of a rear-half portion in the transmission cover 34 of a substantially elongated-circle shape, except for the dome-shaped portion which is the front-half portion, and thereby suppress a so-called membrane oscillation.

In greater detail, the rear-half portion of the transmission cover 34, except for the dome-shaped portion, has the dish shape of a shallow depth. Because of this, the membrane oscillation may tend to occur in the rear-half portion of the transmission cover 34, due to a vibration caused by the motion of the transmission 13, i.e., the rotation of the drive pulley 40 and the rotation of the driven pulley 50, or vibration generated by the engine 12, and noise tends to be generated in the rear-half portion. As described above, because of the presence of the dome-shaped portion 34f and the radial ribs 34g, the front-half portion of the transmission cover 34 has a relatively high stiffness. However, since the rear-half portion of the transmission cover 34 fundamentally has the dish shape of a shallow depth and its outer peripheral portion is fastened to the transmission case body 33, its inner peripheral portion may tend to oscillate like the skin of a drum.

As a solution to this, in the present embodiment, the rear-half portion of the transmission cover 34 is provided with the ribs 34i and 34j extending radially around the driven-side center portion D2 to improve stiffness so that the occurrence of the membrane oscillation is suppressed effectively. For example, as shown in FIG. 7B, twelve driven-side ribs 34i and 34j are provided. Among these twelve driven-side ribs 34i and 34j, seven main ribs 34i have a relatively great thickness. Among the seven main ribs 34i, six main ribs 34i are configured in such a manner that their outer ends are connected to the flange 34b in the vicinity of the bolt holes 34d like the drive-side ribs 34g.

In addition, five sub-ribs 34j which are thinner than the main ribs 34i are arranged along with the six main ribs 34i such that the sub-ribs 34j and the main ribs 34i are disposed alternately in the circumferential direction. The outer ends of the five sub-ribs 34j are connected to the flange 34b, while the inner ends thereof are connected to a circumferential rib 34k surrounding the driven-side center portion. The remaining one main rib 34i, of the seven main ribs 34i, extends in the lengthwise direction of the transmission cover 34 and is connected linearly to the drive-side rib 34g.

Since the rib 34g and the rib 34i are aligned linearly to connect the drive-side center portion to the driven-side center portion in the transmission cover 34, the front-half portion (dome-shaped portion 34f) and the rear-half portion of the transmission cover 34 of an elongated-circle shape can be joined together with an enhanced stiffness, i.e., a bending stiffness of the transmission cover 34 in the lengthwise direction can be enhanced, and its vibration can be suppressed effectively. In addition, as shown in FIG. 3 in addition to FIG. 7A, the transmission cover 34 is provided with a swelling portion 34l swelling outward from a region in the vicinity of the driven-side center portion D2 to the dome-shaped portion 34f, thereby further enhancing the bending stiffness of the transmission cover 34.

This swelling portion 34l swells outward in the transmission cover 34 with an amount which decreases gradually from a region in the vicinity of the dome-shaped portion 34f toward the driven-side center portion, and functions like a brace for coupling the front-half portion (dome-shaped portion 34f) to the rear-half portion in the transmission cover 34. As shown in FIG. 7B, on the inner surface of the swelling portion 34l, the driven-side main rib 34i is provided to extend in the lengthwise direction in a substantially center region in a width direction of the swelling portion 34l. At a boundary region between the swelling portion 34l and the dome-shaped portion 34f, the driven-side main rib 34i is connected linearly to the rib 34g of the dome-shaped portion 34f.

Moreover, an orthogonal rib 34m is provided to extend in a direction orthogonal to the ribs 34g and 34i in a portion at which the ribs 34g and 34i are connected together. The orthogonal rib 34m extends in the width direction of the swelling portion 34l, i.e., along the periphery of the dome-shaped portion 34f, and along the boundary between the dome-shaped portion 34f and the swelling portion 34l. Between the orthogonal rib 34m and the driven-side center portion D2, a circular-arc rib 34n is provided to surround the driven-side center portion D2. That is, inside the swelling portion 34l of the transmission cover 34, the rib 34f and the rib 34g connecting linearly the drive-side center portion D1 and the driven-side center portion D2 together, and the orthogonal rib 34m extending in the direction orthogonal to the ribs 34f and 34g, and the circular-arc rib 34n are provided like a back bone.

In accordance with the belt-type transmission 13 configured as described above, since the air-intake duct 22 and the air discharge duct 23 are attached to the transmission case body 33 in the transmission case 30 accommodating the drive pulley 40, the driven pulley 50 and the V-belt 60, the transmission cover 34 can be detached without detaching the ducts 22 and 23, and thus, maintenance work can be performed more easily. In addition, since the transmission cover 34 entirely has the dish shape of a shallow depth, a wide space for detaching the transmission cover 34 between the transmission cover 34 and the fuel tank 14 in front of (at a right side) of the transmission cover 34 is not necessary. Thus, there is no wasted space.

In the transmission cover 34 entirely having the dish shape of a shallow depth, the front-half portion accommodating the drive pulley 40 is the dome-shaped portion 34f, the swelling portion 34l extends rearward from the dome-shaped portion 34f like a brace, and the ribs 34g, 34i and 34j are provided to extend radially on the dome-shaped front-half portion and on the dish-shaped rear-half portion to enhance the stiffness of the transmission cover 34 effectively. Therefore, the drive shaft 41 of the drive pulley 40 accommodated into the dome-shaped portion 34f can be supported with an enhanced stiffness, and the membrane oscillation of the rear-half portion of the transmission cover 34 is suppressed, thereby lessening emission of noise.

In the transmission cover 34, six radial ribs 34g are provided on the front-half portion, while seven main ribs 34i are provided on the rear-half portion. In addition, the sub-ribs 34j with a relatively smaller thickness are provided, and as a result, twelve ribs 34i and 34j are provided radially on the rear-half portion. Since the number of ribs is greater in the rear-half portion of the dish shape than the front-half portion which is the dome-shaped portion 34f having a swelling shape, the membrane oscillation of the rear-half portion can be suppressed sufficiently. Since the ribs 34g, 34i and 34j are provided on the inner surface of the transmission cover 34, mud is less likely to adhere to the ribs when the utility vehicle 1 is driving on an unpaved road. These ribs may be provided on the outer surface (obverse surface) of the transmission cover 34 if they are used only for reinforcement purposes.

Other Embodiments

The above embodiment is merely exemplary, and is in no way intended to limit the present invention, its applications and uses. Although in the transmission 13 of the present embodiment, the drive pulley 40 and the driven pulley 50 are arranged at the front and at the rear, respectively, for example, the present invention is not limited to this. The two pulleys 40 and 50 may be arranged in the upward and downward direction (vertical direction), or in the rightward and leftward direction.

Although in the present embodiment, the air inlet 31 is provided at the front portion of the transmission case body 33 and the air outlet 32 is provided at the rear portion of the transmission case body 33, the present invention is not limited to this. For example, the air inlet 31 may be provided at the rear portion and the air outlet 32 may be provided at the front portion. The air inlet 31 and the air outlet 32 may be provided at any positions so long as they are provided on the transmission case body 33.

Although in the present embodiment, the front half portion corresponding to the drive pulley 40 is the dome-shaped portion 34f and the swelling portion 34l extends rearward from the dome-shaped portion 34f like a brace in the transmission cover 34, the present invention is not limited to this. The swelling portion 34l or the dome-shaped portion 34f may be omitted. It is not necessary to support the drive shaft 41 by the boss portion 34a provided at the center of the dome-shaped portion 34f, and the drive shaft 41 may be supported at one end thereof.

The above positions, shapes, and the number of the radial ribs 34g, 34i and 34j provided on the transmission cover 34 disclosed in the present embodiment are merely exemplary, and the ribs may have a grated-shape instead of radial shape. Alternatively, the ribs may be omitted. Nonetheless, a plurality of ribs extending radially from the drive-side center portion D1 and the driven-side center portion D2 are preferably provided, in order to suppress the membrane oscillation of the transmission cover 34 to thereby reduce noise.

Although in the present embodiment, the belt-type continuously variable transmission 13 incorporated into the utility vehicle 1 has been described, the transmission 13 may be incorporated into vehicles such as ATVs (all terrain vehicles) or motorcycles, for example, as well as utility vehicles. These vehicles may be hybrid vehicles or electric vehicles rather than gasoline vehicles.

As this invention may be embodied in several forms without departing from the spirit of essential characteristics thereof, the present embodiments are therefore illustrative and not restrictive, since the scope of the invention is defined by the appended claims rather than by the description preceding them, and all changes that fall within metes and bounds of the claims, or equivalence of such metes and bounds thereof are therefore intended to be embraced by the claims.

What is claimed is:

1. A belt-type continuously variable transmission comprising:
 a drive pulley assembly mounted to a drive shaft;
 a driven pulley assembly mounted to a driven shaft;
 a belt wrapped around the drive pulley assembly and the driven pulley assembly; and
 a case assembly for accommodating the drive pulley assembly, the driven pulley assembly, and the belt;
 wherein the case assembly includes:
  a case body having a bottom wall portion joined to a housing of a drive device, and a peripheral wall portion surrounding the drive pulley assembly, the driven pulley assembly, and the belt; and a cover joined to the case body;
  and wherein an air-intake duct through which air from outside is taken into the case body and an air discharge duct through which the air is discharged are attached to the case body;

the cover soley supports the drive shaft among the group comprising the drive shaft, the driven pulley assembly, and the driven shaft;

a plurality of drive-side ribs are provided to extend radially from a drive-side center corresponding to a center axis of a drive shaft portion on an inner surface of the cover;

a plurality of driven-side ribs are provided to extend radially from a driven-side center corresponding to a center axis of the driven shaft portion on the inner surface of the cover;

a total number of the driven-side ribs is greater than a total number of the drive-side ribs.

2. The belt-type continuously variable transmission according to claim 1, wherein the cover has a dish shape elongated in a direction in which the drive pulley assembly and the driven pulley assembly are arranged and includes a dome-shaped portion swelling outward so as to correspond to the drive pulley assembly; and a bearing for supporting an end portion of the drive shaft is provided at a drive-side center portion in the dome-shaped portion.

3. The belt-type continuously variable transmission according to claim 2, wherein the cover has a swelling portion swelling outward such that the swelling portion extends toward the dome-shaped portion from a region in a vicinity of a driven-side center portion; and the swelling portion of the cover swells outward with an amount which gradually decreases from the dome-shaped portion toward the driven-side center portion.

4. The belt-type continuously variable transmission according to claim 1, wherein the inner surface of the cover is provided with a cylindrical boss portion corresponding to a drive-side center portion, a bearing being fitted into the boss portion; and inner ends of the drive-side ribs are connected to the boss portion.

5. The belt-type continuously variable transmission according to claim 4, wherein one of the plurality of drive-side ribs and one of the plurality of driven-side ribs at a driven side are connected to each other to form a longitudinal rib extending in a lengthwise direction of the swelling portion from the boss portion to a driven-side center portion; and a lateral rib is provided on an inner surface of the swelling portion such that the lateral rib extends in a width direction of the swelling portion so as to cross the longitudinal rib.

6. The belt-type continuously variable transmission according to claim 1, wherein a flange of the cover is positioned outward relative to the driven pulley assembly in an axis direction of the driven shaft.

7. The belt-type continuously variable transmission according to claim 1, further comprising a fuel tank positioned laterally outward relative to the cover in an axis direction of the drive shaft.

* * * * *

UNITED STATES PATENT AND TRADEMARK OFFICE
CERTIFICATE OF CORRECTION

PATENT NO. : 8,911,312 B2
APPLICATION NO. : 13/267721
DATED : December 16, 2014
INVENTOR(S) : Seiji Itoo et al.

Page 1 of 1

It is certified that error appears in the above-identified patent and that said Letters Patent is hereby corrected as shown below:

In the claims,

Column 13, line 1, delete "soley" and insert --solely--.

Signed and Sealed this
Thirtieth Day of June, 2015

Michelle K. Lee
*Director of the United States Patent and Trademark Office*